United States Patent
Gabor et al.

(10) Patent No.: US 11,499,205 B2
(45) Date of Patent: Nov. 15, 2022

(54) PROCESS FOR RECOVERING PRECIOUS METALS FROM SECONDARY RESOURCES

(71) Applicant: BRAIN AG, Zwingenberg (DE)

(72) Inventors: Ester Gabor, Zwingenberg (DE); Yvonne Tiffert, Mannheim (DE); Guido Meurer, Seeheim-Jugenheim (DE)

(73) Assignee: BRAIN AG, Zwingenberg (DE)

( * ) Notice: Subject to any disclaimer, the term of this patent is extended or adjusted under 35 U.S.C. 154(b) by 347 days.

(21) Appl. No.: 16/619,724

(22) PCT Filed: Jun. 7, 2018

(86) PCT No.: PCT/EP2018/065044
§ 371 (c)(1),
(2) Date: Dec. 5, 2019

(87) PCT Pub. No.: WO2018/228924
PCT Pub. Date: Dec. 20, 2018

(65) Prior Publication Data
US 2020/0165698 A1    May 28, 2020

(30) Foreign Application Priority Data
Jun. 13, 2017   (EP) ..................... 17175761

(51) Int. Cl.
*C22B 3/18* (2006.01)
*C22B 11/00* (2006.01)

(52) U.S. Cl.
CPC .............. *C22B 3/18* (2013.01); *C22B 11/044* (2013.01); *C22B 11/046* (2013.01)

(58) Field of Classification Search
CPC ....... C22B 3/18; C22B 11/044; C22B 11/046; Y02P 10/20
USPC ......................................................... 75/401
See application file for complete search history.

(56) References Cited

U.S. PATENT DOCUMENTS

| | | | |
|---|---|---|---|
| 5,021,088 A * | 6/1991 | Portier | ...................... C22B 3/18 75/736 |
| 5,427,606 A | 6/1995 | Sceresini | |
| 2007/0119277 A1 | 5/2007 | Russell et al. | |

FOREIGN PATENT DOCUMENTS

| | | |
|---|---|---|
| CN | 103 320 619 A | 9/2013 |
| CN | 106 011 484 A | 10/2016 |

OTHER PUBLICATIONS

CN 103320619A Translation (Year: 2013).*
Isildar et al., "Two-step bioleaching of copper and gold from discarded printed circuit boards (PCB)," Waste Management, vol. 57, Dec. 15, 2010, pp. 149-157.
Faramarzi et al., "Metal solubilization from metal-containing solid materials by cyanogenic Chromobacterium violaceum," J. Biotechnology, vol. 113, Nos. 1-3, Sep. 30, 2004, pp. 321-326.
Campbell et al., "Biogenic production of cyanide and its application to gold recovery," J. Industrial Microbiology & Biotechnology, vol. 26, No. 3, Mar. 2001, pp. 134-139.
Anshu et al., "Comparative assessment of metallurgical recovery of metals from electronic waste with special emphasis on bioleaching," Environmental Science and Pollution Research International, vol. 24, No. 8, Jan. 14, 2017, pp. 6989-7008.

* cited by examiner

*Primary Examiner* — Brian D Walck
*Assistant Examiner* — Danielle Carda
(74) *Attorney, Agent, or Firm* — Dilworth & Barrese, LLP

(57) ABSTRACT

Suggested is a method for recovering precious metals from secondary resources comprising or consisting of the following steps: (a) providing a source of solid waste material comprising precious metals in an amount of at least 0.0001% b.w.; (b) bringing said waste material into contact with heterotrophic micro-organisms capable of producing and releasing hydrocyanic acid; (c) adding a solvent or an aqueous nutrient solution capable of serving as a nutrient source for said micro-organisms to the mixture; (d) depleting said waste materials from the precious metals contained therein by complexation of the metals with said hydrocyanic acid released by said micro-organisms; (e) separating the depleted solid waste material from the liquid containing the metal-cyano complexes; (f) recovering the precious metals from their cyano-complexes in known manner.

14 Claims, No Drawings

PROCESS FOR RECOVERING PRECIOUS METALS FROM SECONDARY RESOURCES

FIELD OF INVENTION

The present invention is related to the area of biomining and discloses a process for recovering precious metals from secondary resources using specific microorganisms, a device suitable for conducting the process and a new microorganism with superior performance in leaching specific materials.

STATE OF THE ART

The recovery of copper from ores by means of cyanide and suitable extractants like guanidine (LIX 7950) or amines (LIX 7820) is known for decades (for example U.S. Pat. No. 3,403,020, 1968). The free cyanide remains in the aqueous phase due to the preferential extraction of $Cu(CN)_3^{2-}$ over $Cu(CN)_4^{3-}$ and $CN^-$ by the extractants. High cyanide levels tend to depress extraction of copper and silver cyanides, but exhibit insignificant effect on extraction of gold, zinc, nickel and iron cyanides. An overview for this technology is provided for example by XIE ET AL in J. Hazardous Materials, Vol. 169, p 333-338 (2009).

While in the past the process for recovering copper and precious metals, in particular gold by using potassium cyanide has led to huge waste dumps contaminated with poisonous materials, todays processes run in closed cycles and do not have the environmental impact as in the past. Nevertheless, working with cyanides even in closed systems is still dangerous, in particular since a plant typically contains hundred thousands of gallons extractants enriched with cyanide.

For this reason it is not surprising that today methods for biological extraction of ores and waste materials, so-called "bioleaching processes" are of high commercial interest. While these processes involve lower environmental impact, they are traditionally optimized only for materials that are rich in target metals, in particular copper. Usually autotrophic bacteria are used for these purposes which are capable of producing sulfuric acid in which copper forms a soluble sulfate. Beside the fact that these processes run rather slowly, they typically do not work for precious metals like gold, silver or platinum, since these metals are insoluble in sulfuric acid. Nowadays, about 24% of world-wide copper production uses bioleaching processes operating at low pH values of less than 3 and using carbon dioxide as the sole carbon source for the microorganisms.

In this context reference is made to European patents EP 0432935 B1 and EP 0695809 A1 (GEOBIOTICS) disclosing processes to recover and reconcentrate gold from its ores. The processes involve a bioleaching step preferably using algae or blue-green cyanobacteriae as suitable microorganisms for producing and releasing hydrocyanic acid to form gold complexes. Among various other microorganisms *Bacillus megaterium* and some *Pseudomonas* sp. are mentioned. The technical teaching of this piece of prior art, however, is directed to recover gold from a source that is particular rich in this precious metal. The document does not provide any guidance with regard to the recovery of precious metals from sources containing them only in traces of a few ppm.

Another well-known microorganism for recovering gold for example from electronic scrap is *Chromobacterium violaceum*. Unfortunately, the efficacy of this bacterium in the leaching process is found to be rather poor [see CAMP-BELL ET AL, J. Industrial Microbiology & Biotechnology, 26, p 134-139 (2001) or FARAMARZI ET AL, J. Biotechnology. 113, 321-326 (2004)].

A particular drawback of using industrial residues and waste materials, however, is their high amount of poisonous metals, in particular lead, since most micro-organisms capable for biomining or bioleaching are rather sensitive to them, in particular when present in high dosages.

Therefore, it has been the object of the present invention to provide a method for recovering precious metals like for example gold, silver, platinum and/or palladium from so-called secondary resources, which means industrial residuals or waste materials, often contaminated with PCB and other organic material, comprising very little amounts of the target metals, typically in the range of 0.2% and less. The process needs to be designed to require very low amounts of HCN produced and released from suitable micro-organisms and to work at a broad pH range of from about 4 to about 11. It is desirous to provide a solution that allows recovering as much precious metal as possible, in particular at least 25% of theory.

A further prerequisite is to recover high yields of precious metals from the industrial residuals or waste materials within short time, thus a much more favorable leaching kinetics is required when compared to autotrophic processes.

Another prerequisite of the present invention has been providing a process using micro-organisms tolerating poisonous metals, like lead etc. also in high dosages as they are typical for industrial residues and waste materials.

Finally, for safety reasons, all microorganisms involved in the process need to belong to risk class 1, since in the future no technical process will pass approval from governmental health and risk authorities involving microorganisms belonging to risk class 2 or even higher.

DESCRIPTION OF THE INVENTION

The object of the present invention is directed to a method for recovering precious metals from secondary resources comprising or consisting of the following steps:

(a) providing a source of solid waste material comprising precious metals in an amount of at least 0.0001% b.w.(=1 ppm);

(b) bringing said waste material into contact with heterotrophic microorganisms capable of producing and releasing hydrocyanic acid;

(c) adding a solvent or an aqueous nutrient solution capable of serving as a nutrient source for said microorganisms to the mixture;

(d) depleting said waste materials from the precious metals contained therein by complexation of the metals with said hydrocyanic acid released by said microorganisms;

(e) separating the depleted solid waste material from the liquid containing the metal-cyano complexes;

(f) recovering the precious metals from their cyano-complexes in known manner.

Surprisingly, it has been observed that the accommodation of steps (a) to (f) provides a process which fulfils all needs as described above. The process according to the present invention allows recovering precious metals, in particular gold and silver, but also palladium and platinum fast, simple and with high yields even from industrial residuals and waste materials containing them in minimal amounts in the range of on average 0.005 to 0.05% b.w. under economic conditions.

Particular useful have been found a number of heterotrophic microorganisms in terms of performance as bioleaching agents and sources for organic hydrocyanic acid on one hand and safety on the other, since all of them belong to risk class 1 (unlike for example *Chromobacterium violaceus*, which belongs to class 2).

Another surprising effect associated with the present invention is the observation that the process allows reducing the amount of cyanide theoretically required to transfer all precious metal into a cyanide complex by at least 50%. This indicates that the present process follows a different mechanism when compared with the amount of abiotic cyanide in processes known from the state of the art.

Secondary Resources

While the process according to the invention is basically also useful for leaching ores and sources rich in specific precious metals, the focus lies on secondary resources containing precious metals, particularly gold, silver, platinum, palladium, rhodium, iridium and their mixtures in rather small portions. The invention is also suitable for leaching copper, which is not typically counted among the term "precious metal".

Typically, the waste materials may contain the precious metals in amounts of about 0.0001 to about 0.2% b.w., preferably about 0.001 to about 0.15% b.w., more preferably about 0.01 to about 0.1% b.w., and particularly preferred about 0.025 to about 0.05% b.w.

It has also been found useful to use secondary resources grinded to a specific particle size of less than 5 mm, preferably less than 1 mm und particularly preferred showing an average diameter of from about 100 μm to 500 μm.

Suitable secondary resources include but are not limited to fly ashes, waste incineration ashes, metal scoriae, electronic scraps and the like.

Microorganisms

The selection of suitable microorganisms has been carried out on the basis of about 2.000 species from public and proprietary microbial strain collections. The microorganisms disclosed by this invention are superior compared to other bioleaching organisms with respect to their ability of leaching precious metals which are present in ppm range.

Suitable microorganisms are selected from the group consisting of:

*Bacillus megaterium,*
*Bacillus mycoides,*
*Chromobacterium aquaticum,*
*Pseudomonas* spec.,
*Rhodococcus* spec.,
*Stenotrophomoas* spec.,
*Streptomyces* spec. and particularly
*Pseudomonas* 11571.

As mentioned above, these microorganisms show a surprising behavior in bioleaching, since they allow conducting the depleting step at a concentration of biogenic hydrocyanic acid released by them which is at most 50% of the concentration of abiotic hydrocyanic acid required to transfer 100% of the precious metal present in the waste material into metal-cyano complexes.

Currently it is not clear, what the scientific explanation for this interesting effect is, but obviously, the process follows a different mechanism and/or a different kinetic.

Cultivating Medium

The present invention involves two alternatives:
(i) (direct) one-step leaching or
(ii) (indirect) two-step leaching.

One-step leaching means, that slurry of finely grinded waste material is brought into contact with the microorganism. The most suitable solvent for this purpose is of course water. Either the microorganism is already dispersed in a nutrient solution or the nutrients or nutrient solutions are added separately. The characteristic of said one-step leaching process is that the microorganisms start producing and releasing biocyanide during the leaching process.

In the alternative, two-step leaching means that the microorganism is already cultivated in a nutrient solution to produce and release biocyanide, and said solution containing the microorganism, remaining nutrients and biocyanide is added to the waste material slurry.

Suitable nutrient compositions are well-known from the prior art and contain minerals, trace elements and carbohydrates, preferably sugar which are required for cultivating and growing the micro-organisms.

Depleting Step

Typically the depleting or leaching step takes place in a stirred vessel. The waste material is grinded—if required—to a small particle size for example by means of a ball mill, subjected with water or any other suitable solvent to form slurry and pumped into the reactor. Usually, the slurries show a solid matter content of about 0.1 to about 50% b.w., preferably of about 1 to about 30% b.w. and more preferably of about 2.5 to about 25% b.w.

It is also desirous conducting depletion within a pH range of from about 7 to about 10. Higher pH values are advantageous since HCN is kept in the solution and evaporation of hazardous chemicals is reduced if not avoided. At the same time, more extraction agent is available for the process which improves efficacy. In a preferred embodiment the process is started at a pH of about 7.5 to increase growth of the micro-organisms and later shifted step by step towards higher values to increase the yields.

The micro-organisms are added—either as dry biomass or a solution; depending whether it is a one or two-step process also nutrients are added. Typically, leaching requires an amount of microorganisms (cell dry weight, cdw) in the range of 0.01 to about 10% by weight, preferably about 0.1 to about 5% by weight and particularly about 0.5 to about 5% b.w.—calculated on the amount of waste material that needs to be depleted from the precious metals.

Leaching is conducted at a temperature slightly depending on the nature of the microorganisms, typically within a range of from about 20 to about 40° C., preferably at temperatures of from 25 to 35° C. according to the working optimum of the microorganisms. Typically, leaching takes place under vigorous stirring, optionally the reactor is aerated. To achieve a sufficient degree of depleting leaching typically requires a reaction time of about 10 to about 120 hours, and preferably about 16 to about 36 hours.

Separation

Once leaching is completed, the mixture is transferred into a separation unit. In its easiest embodiment the separation takes place in a tank by gravity. More efficient are filtration units, in particular filter presses, which are available in different forms:

For example, a plate and frame filter press is the most fundamental design, and many now refer it as a "filter plate". This type of filter press consists of many plates and frames assembled alternately with the supports of a pair of rails. The presence of a centrifuge pump ensures the remaining suspended solids do not settle in the system, and its main function is to deliver the suspension into each of the separating chambers in the plate and frame filter. For each of the individual separating chambers, there is one hollow filter frame separated from two filter plates by filter cloths. The introduced slurry flows through a port in each individual frame, and the filter cakes are accumulated in each hollow frame. As the filter cake becomes thicker, the filter resistance increases as well. So when the separating chamber is full, the filtration process is stopped as the optimum pressure difference is reached. The filtrate that passes through filter cloth is collected through collection pipes and stored in the filter tank. Filter cake (suspended solid) accumulation occurs at the hollow plate frame, then being separated at the filter plates by pulling the plate and frame filter press apart. The cakes then fall off from those plates and are discharged to the final collection point.

Cake discharge can be done in many ways. For example: Shaking the plates while they are being opened or shaking the cloths. A scraper can also be used, by moving from one chamber to another and scraping the cake off the cloth. At the end of each run, the cloths are cleaned using wash liquid and are ready to start the next cycle.

In the alternative, an automatic filter press has the same concept as the manual filter and frame filter, except that the whole process is fully automated. It consists of larger plate and frame filter presses with mechanical "plate shifters". The function of the plate shifter is to move the plates and allow rapid discharge of the filter cakes accumulated in between the plates. It also contains a diaphragm compressor in the filter plates which aids in optimizing the operating condition by further drying the filter cakes.

A recessed plate filter press is usually made up of polypropylene squares at about 2 to 4 feet across with a concave depression and a hole in the center of each. Two plates join together to form a chamber to pressurize the slurry and squeeze the filtrate out through the filter cloth lining in the chamber. It is capable of holding 12 to 80 plates adjacent to each other, depending on the required capacity. When the filter press is closed, a series of chambers is formed. The differences with the plate and frame filter are that the plates are joined together in such a way that the cake forms in the recess on each plate, meaning that the cake thickness is restricted to 32 mm unless extra frames are used as spacers. However, there are disadvantages to this method, such as longer cloth changing time, inability to accommodate filter papers, and the possibility of forming uneven cake.

The preferred embodiment of the present invention encompasses separation by means of a chamber filter press or a centrifuge.

In case the process is conducted in a continuous manner, also pressure-forced filtration could be of advantage, although more cost intensive. For example, diafiltration represents a suitable alternative, where slurry is separated from the liquid phase by means of membranes made of ceramics, steel or polymers.

It is also possible to add further additives for facilitating separation such as redoxmodulators (e.g. hydrogen peroxide) or flocculation agents such as poly acrylates, alginates, starches and the like.

Adsorption

In order to recover the precious metals dissolved as cyano-complexes from the solvent, the liquid phase is transferred into an adsorption unit. It its easiest embodiment, said unit is a stirred vessel filled with any adsorption agent that is capable of physically binding the metal-cyano complexes out of the liquid phase. Another embodiment could be a packed column. Suitable adsorption agents encompass resins that bind metals through coordination or ion-exchange chemistry, including but not limited to Lewatit® MP 62 or other resins of Lewatit® type supplied for example by Lanxess. In case the step is carried out in a vessel, complete adsorption requires about 15 to about 60 minutes, and preferably about 20 to 30 minutes at ambient temperature. Carrying out adsorption in a column has the advantage that the step can be conducted in a continuous manner.

Recovery

A first suitable manner to remove the precious metal-cyano complexes adsorbed by the adsorption agent is to elute them by means of a suitable solvent, removing the solvent and liberating the metals from the complex by chemical means, for example by pH-change.

Preferably, the precious metals are recovered from said adsorption agents by incineration of the adsorption agent. The residue can be subjected to further purification processes.

Device

A further embodiment of the present invention refers to a device for conducting the process of Claim 1, comprising or consisting of the following parts:

(i) a reactor, preferably a stirred, aerated vessel, capable of sustaining microbial growth and leaching the waste metal;
(ii) a separation unit, capable of separating the depleted solid residue from the liquid phase
(iii) an adsorption unit comprising a suitable adsorption agent, capable of adsorbing the diluted metal-cyano complexes from the liquid phase, and
(iv) a recovery unit, capable of releasing the precious metals or metal-cyano complexes from the adsorption agent.

Basically, said device is suitable for a batch process. However, it is also possible to design a continuous plant for example, by combining a continuous vessel reactor with a diafiltration unit and an adsorption column.

Pseudomonas

A final embodiment refers to a method for identifying micro-organisms capable for biomining and/or bioleaching and a new soil microorganism, which is obtainable according to the following procedure: plating a soil suspension in 0.85% NaCl on 0.5×HD nutrient agar plates supplemented with 4 mM KCN and 100 µg/ml nystatin. Appearing microbial colonies are transferred and purified by a "clean streak" on fresh agar plates and subsequently analyzed for hydrocyanic acid production as well as for leaching efficiency of precious metals from secondary resource. Microorganisms that meet the performance criteria are phylogenetically characterized by 16S rDNA analysis, genome sequencing and physiological tests (Analytical Profile Index/API system and Biolog PM1 and PM2a test plates).

EXAMPLES

Comparative Example 1

Electronic scrap, i.e. printed card boards (PCB) was subjected to bioleaching using
(a) *Chromobacterium aquaticum*, DSMZ 19852 (according to the invention)
(b) *Pseudomonas* HB11571 (according to the invention)
(c) *Chromobacterium violaceum*, DSMZ 30191 (for comparison)
as heterotrophic microorganisms capable of producing and releasing hydrocyanic acid. The waste material with regard to metals mainly consisted of copper (6% b.w.), iron (6% b.w.), aluminum (4% b.w.) and zinc (2% b.w.). It also contained traces of precious metal, particularly silver, gold and palladium.

Sample material was finely grinded in an impact mill. The resulting fine fraction (<1 mm) was used for leaching experiments. 1 g of this material was added to a leaching vessel having a volume of 0.3 l. The vessel was filled with 0.1 l of an aqueous solution comprising the microorganisms (a), (b) or (c), respectively in an amount of about 1 g/l wet weight, also containing minerals and carbohydrates in amounts suitable to serve as nutrients for the microorganisms. An amount of 0.5 g glycerin was added to sustain hydrocyanic acid production. The mixture was heated to about 30° C. and agitated over a period of 120 h at about 180 rpm. Subsequently, the slurry was collected by centrifugation and the liquid phase was analyzed for the amount of released precious metals and copper by ICP-MS analysis. Experiments were carried out in triplicate. The results are shown in Table 1.

TABLE 1

Recovery of precious metals from PCB

| | | Example 1 | | |
|---|---|---|---|---|
| | Content [ppm] | Efficacy C. violaceum [%] | Efficacy C. aquaticum [%] | Efficacy HB11571 [%] |
| Ag | 713 | 2.8 ± 0.04 | 7.0 ± 8.0 | 12.6 ± 3.4 |
| Au | 80 | 15.4 ± 0.8 | 14.4 ± 5.9 | 20.3 ± 4.2 |
| Pd | 46 | 35.4 ± 3.1 | 25.6 ± 5.9 | 23.8 ± 0.5 |

*Pseudomonas* HB11571 shows a 5-fold increased leaching efficiency of silver and 30% better leaching of gold than *Chromobacterium violaceum*. Leaching efficacies of the two *Chromobacterium* species are comparable. *Chromobacterium aquaticum* as well as *Pseudomonas* HB11571, however, belong to risk group 1, while *Chromobacterium violaceum* belongs to risk group 2, compromising the use of the latter microorganisms in an economically viable, industrial set-up.

Example 2, Illustrative Example C2

Mineral sludge was subjected to bioleaching in a leaching reactor using
(a) *Chromobacterium aquaticum* DSMZ 19852 (According to the Invention)
as heterotrophic microorganisms capable of producing and releasing hydrocyanic acid. The waste material with regard to metals mainly consisted of iron (13% b.w). It also contained traces of precious metal, particularly gold.

Mineral sludge was finely grinded using a ball mill and 37.5 g was added to a leaching reactor having a volume of 1.2 l. The reactor was filled with 0.75 l of an aqueous solution comprising the microorganism (a) in an amount of about 1 g/l (wet weight), also containing minerals and carbohydrates in amounts suitable to serve as nutrients for the microorganisms. To support hydrocyanic acid production, casamino acids and glycin (0.5% w/v) were added. The mixture was heated to 28° C. and agitated over a period of 48 h at about 500 rpm and aeration of 0.5 vvm. The slurry thus obtained was mixed with 16 ppm of an anionic coagulant, 20 ppm aluminium silicate and 100 ppm of a neutral polyacrylate to induce flocculation and facilitate the following filtration in a Beco Integra LAB60P filtration unit. The cleared liquid phase was transferred to a column filled with a polymeric metal adsorption resin (3 ml bed volume). The solution passed the column with a flow rate of 26 ml/h. Finally, the resin containing the metal-cyano complexes was transferred into a combustion unit and incinerated with a temperature gradient from 100-1100° C. From the residue the precious metals were recovered. The results are shown in Table 2:

TABLE 2

Recovery of precious metals from mineral sludge

| | | Example 2 | | |
|---|---|---|---|---|
| | Content [ppm] | Extracted metal [mg] | Efficiency of extraction [%] | Recovery after combustion [mg] |
| Au | 1,489 | 19.1 | 36 | 8.8 |

With the cyanogenic microorganism, more than 36% of the present gold could be extracted from the mineral sludge. Of the extracted gold more than 50% was recovered as raw gold nugget after adsorption to the polymeric resin and incineration.

Example 3, Illustrative Example C3

Mineral fly ash was subjected to bioleaching using
(a) *Chromobacterium aquaticum* (According to the Invention)
as heterotrophic microorganism capable of producing and releasing hydrocyanic acid. The waste material with regard to metals mainly consisted of zinc (20% b.w) and copper (3%). It also contained traces of precious metal, particularly silver (0.2% b.w.).

The fly ash did not require grinding due to its fine particle distribution. Two samples of each 0.5 g were added to 0.3 L leaching vessels. One vessel was filled with 0.1 L of an aqueous solution, comprising minerals and carbohydrates in amounts suitable to support microbial growth, and microorganism (a) at a concentration of about 1 g/L. To support in situ hydrocyanic acid production, casamino acids and glycin (0.5% w/v) were added. The other vessel was filled with 0.1 L of a stationary culture of microorganism (a) that was grown under conditions allowing hydrocyanic acid production, i.e. hydrocyanic acid production took place ex situ thus before contacting the culture with the material to be leached. Both vessels were incubated at 30° C. for and agitated over a period of 16 h on an orbital shaker at 180 rpm. Subsequently, the slurries thus obtained were centrifuged and the clear supernatant was analyzed for metals using ICP-MS. The results are shown in Table 3:

TABLE 3

Recovery of precious metals from fly ash

| | in situ | | | ex situ | | |
|---|---|---|---|---|---|---|
| | Content [ppm] | Recovered [µg] | Efficacy [%] | Content [ppm] | Recovered [µg] | Efficacy [%] |
| Ag | 1.934 | 107 | 11 | 1.934 | 1120 | 115[1] |

*Chromobacterium aquaticum* was found to provide an increase in efficacy of about 10-fold in an ex situ setup compared to in situ bioleaching. Due to the high silver content in mineral fly ash, the material is toxic to the microorganisms, leading to decreased leaching efficiency in in situ bioleaching.

[1] The apparent leaching efficiency of >100% is due to material inhomogeneity.

The invention claimed is:
1. A method for recovering precious metals from secondary resources comprising the following steps:

(a) providing a source of solid waste material comprising precious metals in an amount of at least 0.0001% b.w. and which has not been subject to a separate copper leaching;
(b) bringing said waste material into contact with heterotrophic microorganisms capable of producing and releasing hydrocyanic acid;
(c) adding a solvent or an aqueous nutrient solution capable of serving as a nutrient source for said microorganisms to form a mixture;
(d) depleting said waste materials from the precious metals contained therein by complexation of the metals with said hydrocyanic acid released by said microorganisms;
(e) separating the depleted solid waste material from the liquid containing the metal-cyano complexes; and
(f) recovering the precious metals from their cyano-complexes,
wherein the depleting step is conducted at a concentration of biogenic hydrocyanic acid released by said microorganisms which is at least as much as necessary to transfer 100% of the precious metal present in the waste material into metal-cyano complexes, and at most 50% of the concentration of abiotic hydrocyanic acid required to transfer 100% of the precious metal present in the waste material into metal-cyano complexes, and
the liquid obtained from step (e) is brought into contact with an adsorption agent capable of physically binding the metal-cyano complexes out of the liquid phase.

2. The method of claim 1, wherein said solid waste material is selected from the group consisting of fly ashes, waste incineration ashes, metal scoriae, electronic scraps, and mixtures thereof.

3. The method of claim 1, wherein said precious metals are selected from the group consisting of gold, silver, platinum, palladium, rhodium, iridium, and mixtures thereof.

4. The method of claim 1, wherein said solid waste material contains 0.2 to 0.0001% b.w. precious metals.

5. The method of claim 1, wherein said solid waste material shows a particle size of less than 5 mm.

6. The method of claim 1, wherein said heterotrophic microorganisms are selected from the group consisting of *Bacillus megaterium, Bacillus mycoides, Chromobacterium aquaticum, Pseudomonas* spec., *Rhodococcus* spec., *Stenotrophomoas* spec., *Streptomyces* spec., *Pseudomonas* 11571, and mixtures thereof.

7. The method of claim 1, wherein the aqueous nutrient solution contains minerals, trace elements, and/or carbohydrates.

8. The method of claim 1, wherein depletion of the waste material takes place at a temperature of about 20 to about 40° C.

9. The method of claim 1, wherein separation of solids from liquids takes place by gravity, filtration or centrifugation.

10. The method of claim 1, wherein said adsorption agent is a resin or charcoal.

11. The method of claim 1, wherein said precious metals are recovered from said adsorption agents by solvent elution of the metal-cyano complexes, removing the solvent and liberating the metals from their complexes by pH change.

12. The method of claim 1, wherein said solid waste material contains about 0.025 to 0.05% b.w. precious metals.

13. The method of claim 1, wherein said solid waste material shows an average particle diameter of from about 100 μm to about 500 μm.

14. The method of claim 1, wherein depletion of the waste material takes place at a temperature of about 20 to about 25° C.

* * * * *